(12) United States Patent
Weisse et al.

(10) Patent No.: US 10,371,165 B2
(45) Date of Patent: Aug. 6, 2019

(54) FAN BLADE COMPOSITE RIBS

(71) Applicant: UNITED TECHNOLOGIES CORPORATION, Farmington, CT (US)

(72) Inventors: Michael A. Weisse, Tolland, CT (US); Kwan Hui, Tucker, GA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 539 days.

(21) Appl. No.: 15/032,526

(22) PCT Filed: Oct. 9, 2014

(86) PCT No.: PCT/US2014/059897
§ 371 (c)(1),
(2) Date: Apr. 27, 2016

(87) PCT Pub. No.: WO2015/102715
PCT Pub. Date: Jul. 9, 2015

(65) Prior Publication Data
US 2016/0265548 A1    Sep. 15, 2016

Related U.S. Application Data (60) Provisional application No. 61/897,634, filed on Oct. 30, 2013.

(51) Int. Cl.
F01D 5/04      (2006.01)
F04D 29/38     (2006.01)
(Continued)

(52) U.S. Cl.
CPC ......... F04D 29/388 (2013.01); F01D 5/147 (2013.01); F01D 5/282 (2013.01); F04D 29/023 (2013.01);
(Continued)

(58) Field of Classification Search
None
See application file for complete search history.

(56) References Cited

U.S. PATENT DOCUMENTS 5,634,771 A    6/1997   Howard et al.
5,725,355 A *  3/1998   Crall ............... F01D 5/147
                                            416/229 A
(Continued)

FOREIGN PATENT DOCUMENTS

EP    2243929 A2    10/2010
WO    2014031203 A2    2/2014

OTHER PUBLICATIONS

International Search Report for International application No. PCT/US2014/059897; International filing date: Oct. 9, 2014; dated Jul. 17, 2015; 5 pgs.
(Continued)

Primary Examiner — Jason D Shanske
Assistant Examiner — Theodore C Ribadeneyra
(74) Attorney, Agent, or Firm — Cantor Colburn LLP (57) ABSTRACT

A fan blade has a blade body, a composite rib and a cover. The blade body extends from a blade root to an opposed blade tip along a longitudinal axis. The blade body defines a leading edge and a trailing edge. A first airfoil surface extends from the leading edge to the trailing edge A pocket is defined between the leading edge, the trailing edge, the blade root, and the blade tip. The pocket has a bottom surface that opposes the first airfoil surface across the blade body. The composite rib is disposed in the pocket. The cover is mounted to the composite rib and the blade body to form a second airfoil surface opposed to the first airfoil surface.

15 Claims, 6 Drawing Sheets

(51) Int. Cl.
*F01D 5/14* (2006.01)
*F01D 5/28* (2006.01)
*F04D 29/02* (2006.01)
*F04D 29/32* (2006.01)

(52) U.S. Cl.
CPC ........ *F04D 29/325* (2013.01); *F05D 2220/36* (2013.01); *F05D 2250/75* (2013.01); *Y02T 50/672* (2013.01)

(56) References Cited

U.S. PATENT DOCUMENTS

| | | | |
|---|---|---|---|
| 5,797,182 A * | 8/1998 | Furlan | B23K 1/0016 29/889.21 |
| 5,839,882 A | 11/1998 | Finn et al. | |
| 6,039,542 A * | 3/2000 | Schilling | F01D 5/16 416/224 |
| 6,364,616 B1 * | 4/2002 | Stevenson | B64C 11/00 416/224 |
| 6,994,525 B2 * | 2/2006 | Weisse | B23P 15/04 29/889.72 |
| 7,334,333 B2 * | 2/2008 | Palazzini | B23P 15/04 29/463 |
| 7,334,997 B2 | 2/2008 | Karafillis | |
| 7,980,817 B2 * | 7/2011 | Foose | F01D 5/147 415/191 |
| 8,763,360 B2 * | 7/2014 | Murdock | F01D 5/18 416/231 B |
| 9,556,745 B2 * | 1/2017 | Papin | F01D 5/147 |
| 9,920,650 B2 * | 3/2018 | Hyatt | B25B 11/002 |
| 9,957,824 B2 * | 5/2018 | Klinetob | F01D 5/16 |
| 10,060,266 B2 * | 8/2018 | Cosby | F01D 5/18 |
| 2005/0254955 A1 | 11/2005 | Helder et al. | |
| 2010/0209235 A1 * | 8/2010 | Shim | B23P 15/04 415/200 |
| 2013/0078107 A1 | 3/2013 | Weisse et al. | |
| 2013/0108470 A1 * | 5/2013 | Weisse | F01D 5/147 416/97 R |
| 2013/0167555 A1 | 7/2013 | Schwarz et al. | |
| 2014/0170435 A1 * | 6/2014 | Hui | F01D 5/147 428/613 |
| 2015/0044052 A1 * | 2/2015 | Worth | F04D 29/023 416/212 R |
| 2015/0267541 A1 * | 9/2015 | Hui | F01D 5/141 416/227 R |

OTHER PUBLICATIONS

International Written Opinion for International application No. PCT/US2014/059897; International filing date: Oct. 9, 2014; dated Jul. 17, 2015; 7 pgs.
European Search Report for Application No. 14876029.1-1610/ 3063378 PCT/US2014059897; dated Oct. 17, 2017; 6 pgs.

* cited by examiner

FAN BLADE COMPOSITE RIBS

RELATED APPLICATIONS

This application claims the benefit of and priority to U.S. Provisional Patent Application No. 61/897,634 filed Oct. 30, 2013, the contents of which are incorporated herein by reference in their entirety.

BACKGROUND OF THE INVENTION

1. Field of the Invention

The present disclosure relates to fan blades, and more particularly to fan blade assemblies for gas turbine engines, for example.

2. Description of Related Art

Traditionally, a turbo fan engine for an aircraft has a turbine that drives fan blades to draw air into the engine as the turbine rotates. The fan blades are exposed to the atmosphere in front of the engine and have the potential for an impact with birds or other foreign objects that may be drawn into the engine.

It is known that fan blades can be made out of titanium or aluminum. Traditional titanium fan blades are relatively strong, but they are heavy and expensive to manufacture. In order to reduce weight without sacrificing strength, it is known to machine out pockets from a titanium fan blade and adhere a cover to the fan blade. However, impact with a bird or other foreign object, as described above, can damage the blade and cover and lead to premature failure.

Such conventional methods and systems have generally been considered satisfactory for their intended purpose. However, there is still a need in the art for blade assemblies that allow for improved impact resistance. The present disclosure provides a solution for these problems.

SUMMARY OF THE INVENTION

A fan blade has a blade body, a composite rib and a cover. The blade body extends from a blade root to an opposed blade tip along a longitudinal axis. The blade body defines a leading edge and a trailing edge, a first airfoil surface extending from the leading edge to the trailing edge, and a pocket defined between the leading edge, the trailing edge, the blade root, and the blade tip. The pocket has a bottom surface that opposes the first airfoil surface across the blade body. The composite rib is disposed in the pocket. The cover is mounted to the composite rib and the blade body to form a second airfoil surface opposed to the first airfoil surface.

The composite rib can be adhered to the bottom surface of the pocket and to the cover. Specifically, the composite rib can be adhered to an interior surface of the cover. The composite rib can be configured to resist shear and tension forces acting on the cover in order to secure the cover to the blade body. The pocket of the blade body can be at least partially filled with lightweight filler material. The cover can include a composite material and/or titanium. The blade body can include titanium. The composite rib can extend from a leading edge side to a trailing edge side of the pocket. Further, the composite rib can be adhered to the leading edge side and the trailing edge side of the pocket.

It is contemplated that the blade body can include a blade rib defined between the leading edge and trailing edge. The blade rib can be integral with the blade body and/or the composite rib can be adhered to the blade rib. The composite rib can include a groove corresponding to a shape of the blade rib. The blade rib can be adhered within the groove to increase a surface area of the composite rib in contact with the blade rib.

The blade body can further define a plurality of sub-pockets. A plurality of composite rib portions can each be disposed in a respective one of the sub-pockets. The plurality of composite rib portions can be shaped to correspond to a shape of the blade rib and can be configured to increase a surface area of the composite rib in contact with the blade rib. The plurality of composite rib portions can be adhered to the blade rib, and/or adhered to an interior surface of the cover. It is also contemplated that the blade body can include a recessed lip defined around its perimeter. An interior surface of the cover can be adhered to the blade body on the recessed lip. The recessed lip can be configured to allow the cover to be mounted flush with the blade body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
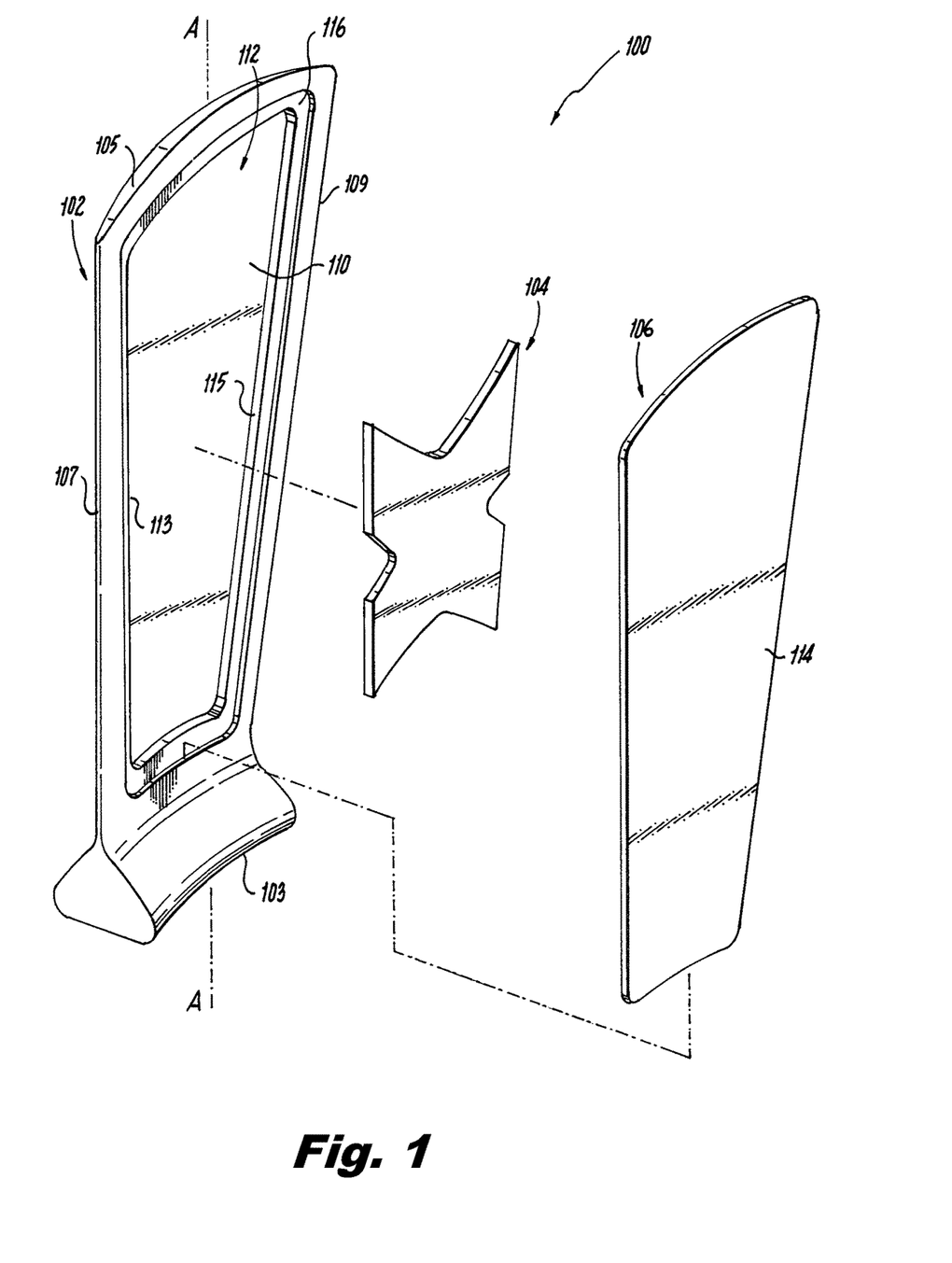
FIG. 1 is a is a perspective exploded view of an exemplary embodiment of a fan blade constructed in accordance with the present disclosure, showing a blade body, a composite rib and a cover.

Reference will now be made to the drawings wherein like reference numerals identify similar structural features or aspects of the subject disclosure. For purposes of explanation and illustration, and not limitation, an exploded view of an exemplary embodiment of a fan blade in accordance with the disclosure is shown in FIG. 1 and is designated generally by reference character 100. Other embodiments of fan blades in accordance with the disclosure, or aspects thereof, are provided in FIGS. 2-8, as will be described.

As shown in FIG. 1, a fan blade 100 has a blade body 102, a composite rib 104 and a cover 106. Blade body 102 extends from a blade root 103 to an opposed blade tip 105 along a longitudinal axis A. Blade body 102 defines a leading edge 107 and a trailing edge 109, a first airfoil surface 111, shown in FIG. 3, extending from leading edge 107 to trailing edge 109, and a pocket 112 defined between leading edge 107, trailing edge 109, blade root 103, and blade tip 105. Pocket 112 has a bottom surface 110 that opposes first airfoil surface 111, shown in FIG. 3, across blade body 102. Those skilled in the art will readily appreciate that composite rib 104 can include lightweight filler material.

Figure 8:
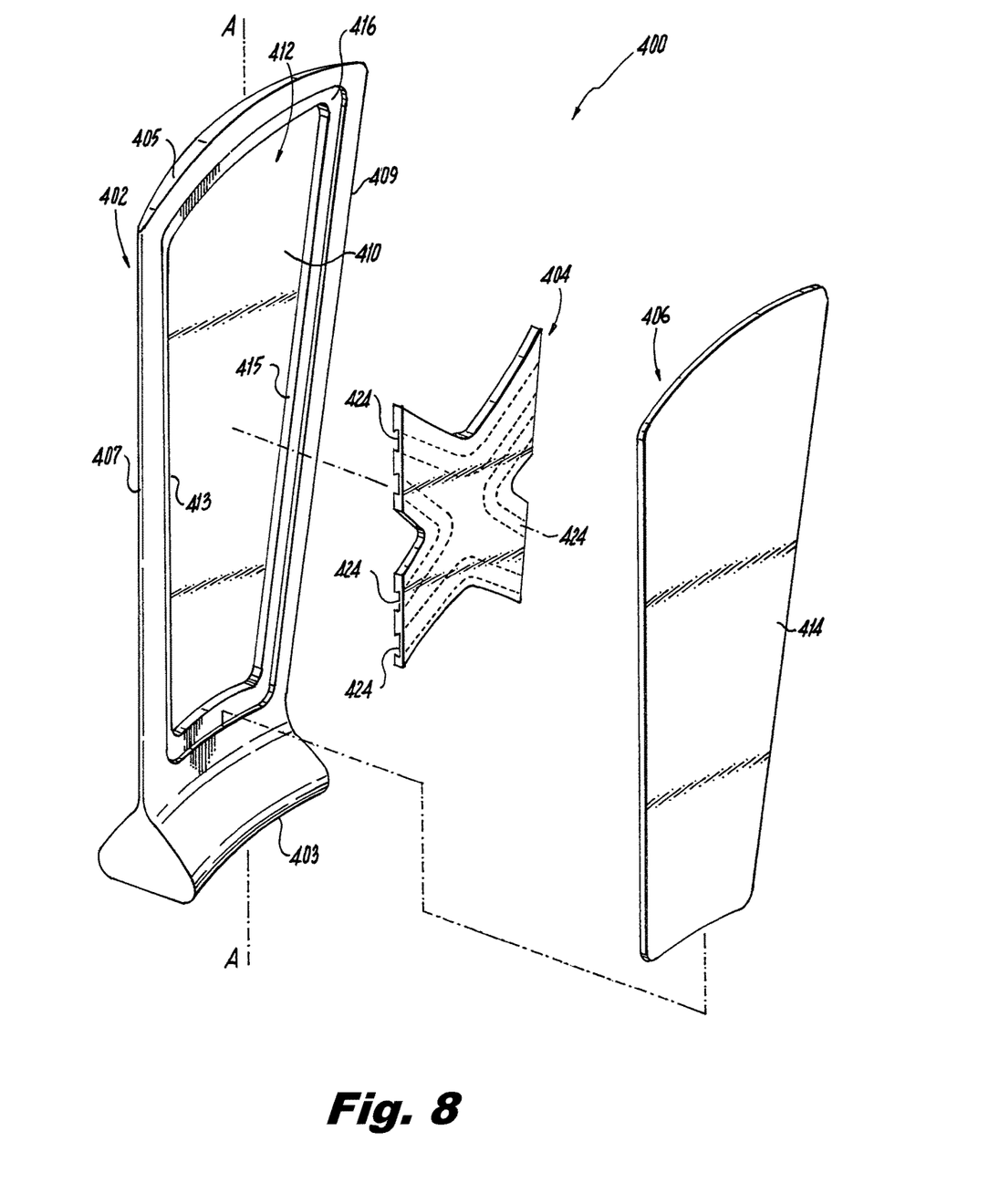
FIG. 8 is a is a perspective exploded view of an exemplary embodiment of a fan blade constructed in accordance with the present disclosure, showing the blade body and cover of FIG. 1, and a composite rib with weight reducing cavities.

As shown in FIG. 8, a fan blade 400 has a blade body 402, a composite rib 404 and a cover 406. Fan blade 400 is substantially similar to fan blade 100 except for cavities 424 included in composite rib 404. Those skilled in the art will readily appreciate that cavities 424 can reduce the weight of fan blade 400 without reducing adhesive area between cover 406 and composite rib 404.

Figure 2:
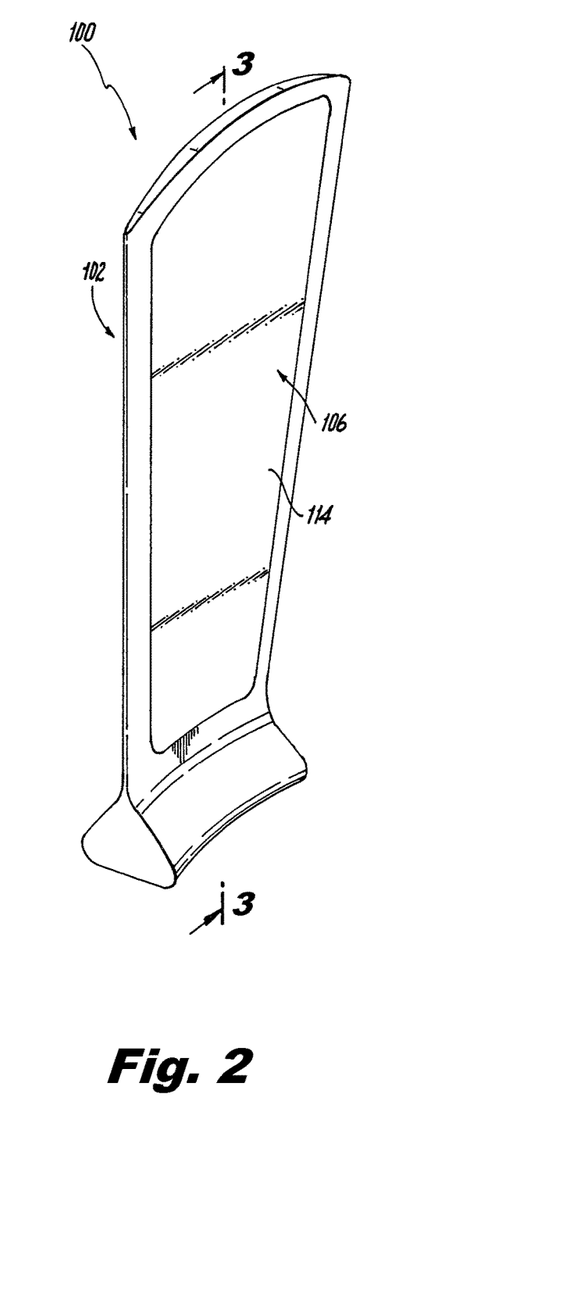
FIG. 2 is a perspective view of the fan blade of FIG. 1, showing the fan blade.

Now with reference to FIG. 2, fan blade 100 has cover 106 mounted to blade body 102. Cover 106 is mounted to composite rib 104 and blade body 102 to form a second airfoil surface 114 opposed to first airfoil surface 111, shown in FIG. 3. While shown and described as having a single composite rib 104, those skilled in the art will readily appreciate that fan blade 100 can have multiple composite ribs 104, and that there are a variety of suitable shapes for composite ribs 104.

Figure 3:
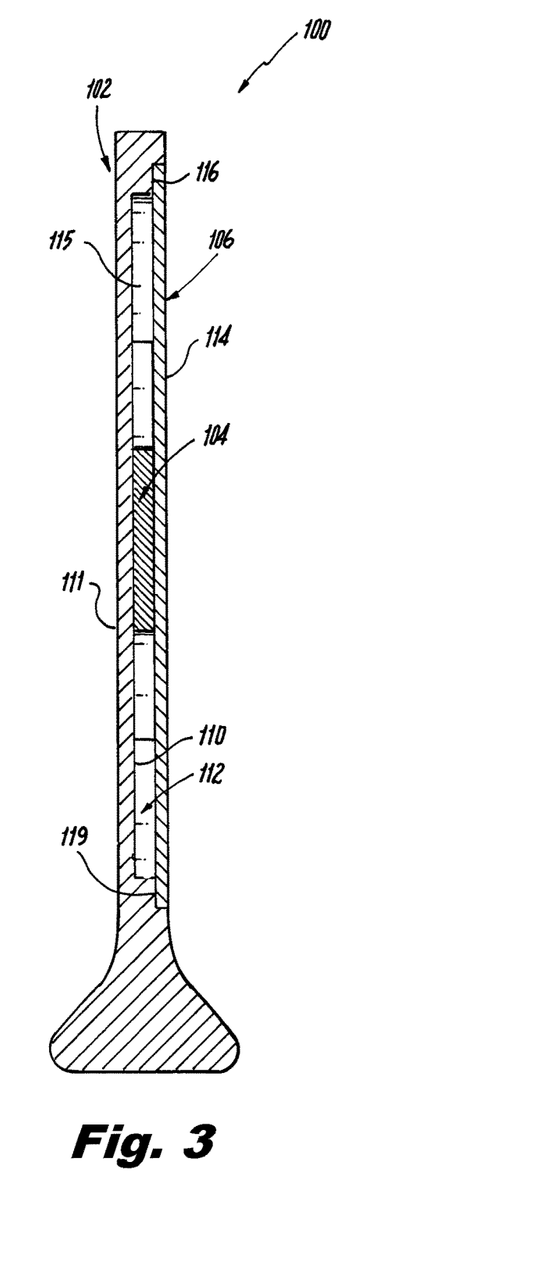
FIG. 3 is a cross-sectional view side-elevation view of the fan blade of FIG. 2, showing the composite rib adhered to the cover and blade body.

As shown in FIG. 3, composite rib 104 is disposed in pocket 112. Blade body 102 includes a recessed lip 116 defined around its perimeter. An interior surface 119 of cover 106 is adhered to blade body 102 on recessed lip 116. Recessed lip 116 is configured to allow cover 106 to be mounted flush with blade body 102. Composite rib 104 is adhered to bottom surface 110 of pocket 112 and to cover 106. Specifically, composite rib 104 is adhered to interior surface 119 of cover 106. Composite rib 104 is configured to resist shear and tension forces acting on cover 106 in order to secure cover 106 to blade body 102. Composite rib 104 extends from a leading edge side 113 to a trailing edge side 115 of pocket 112, and composite rib 104 is adhered to leading edge side 113 and trailing edge side 115 of pocket 112. Those skilled in the art will readily appreciate that pocket 112 of blade body 102 can be at least partially filled with lightweight filler material. It is also contemplated that cover 106 can include a composite material and/or titanium, and that blade body 102 can include titanium.

Figure 4:
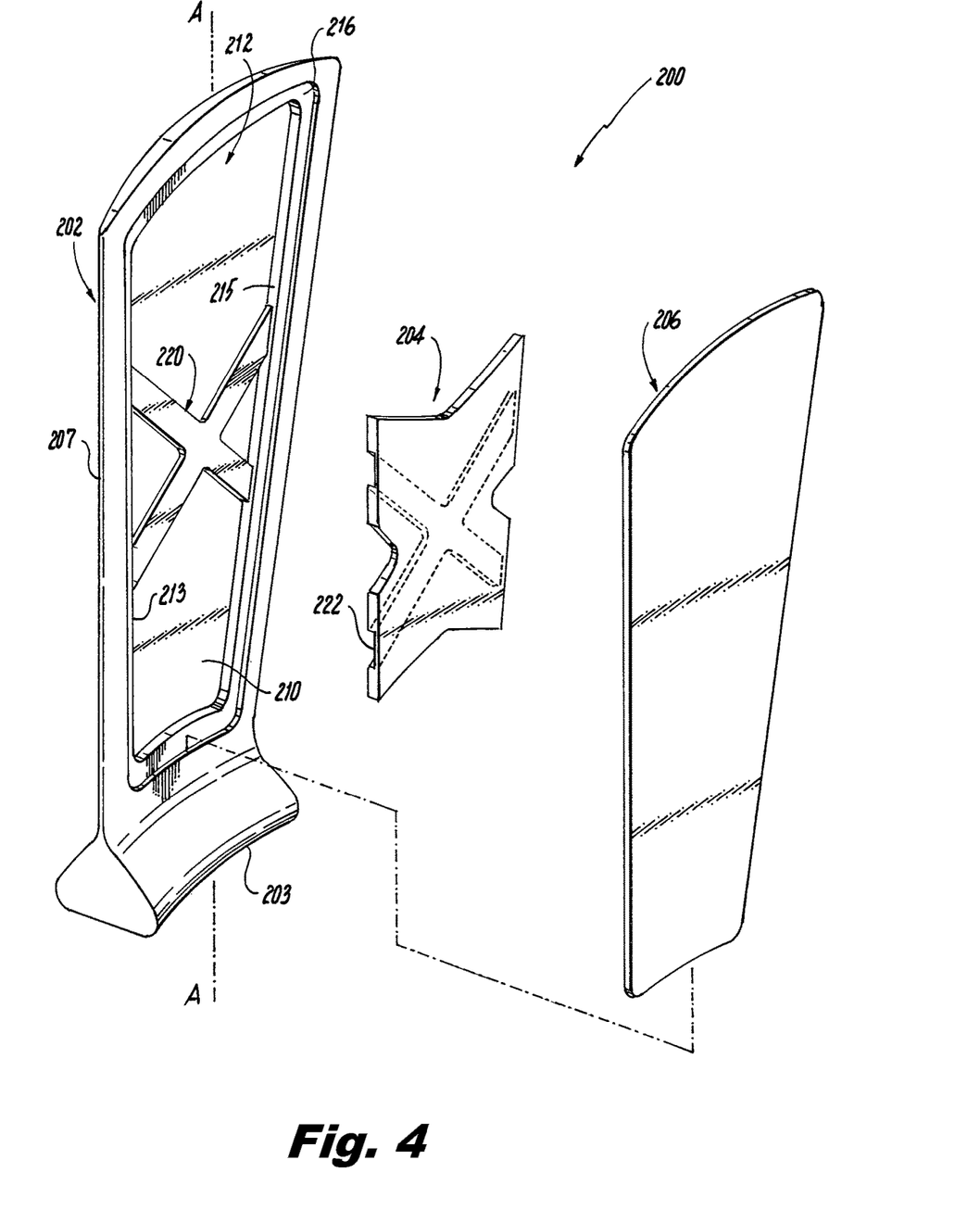
FIG. 4 is a perspective exploded view of another exemplary embodiment of a fan blade constructed in accordance with the present disclosure, showing a blade rib, a composite rib with grooves, and a cover.

As shown in FIG. 4, another exemplary embodiment of a fan blade 200 has a blade body 202, a composite rib 204 and a cover 206. Blade body 202 is substantially similar to blade body 102, described above, except blade body 202 includes a blade rib 220. Blade body 202 extends from a blade root 203 to an opposed blade tip 205 along a longitudinal axis A. Blade body 202 defines a leading edge 207 and a trailing edge 209, a first airfoil surface 211, shown in FIG. 6, extending from leading edge 207 to trailing edge 209, and a pocket 212 defined between leading edge 207, trailing edge 209, blade root 203, and blade tip 205. Pocket 212 has a bottom surface 210 that opposes first airfoil surface 211, shown in FIG. 6, across blade body 202. Blade rib 220 is defined between leading edge 207 and trailing edge 209. Blade rib 220 is integral with blade body 202.

Figure 5:
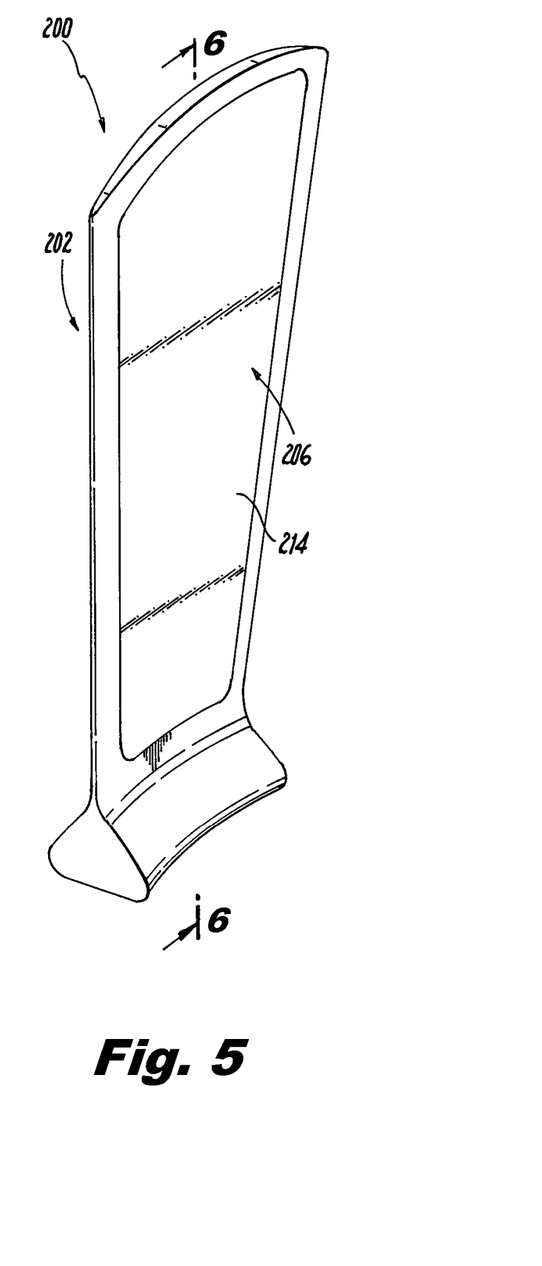
FIG. 5 is a perspective view of the fan blade of FIG. 4, showing the assembled fan blade.

Referring now to FIG. 5, fan blade 200 has cover 206 mounted to blade body 202. Cover 206 is mounted to composite rib 204, as shown in FIG. 4, and blade body 202 to form a second airfoil surface 214 opposed to first airfoil surface 211, shown in FIG. 6.

Figure 6:
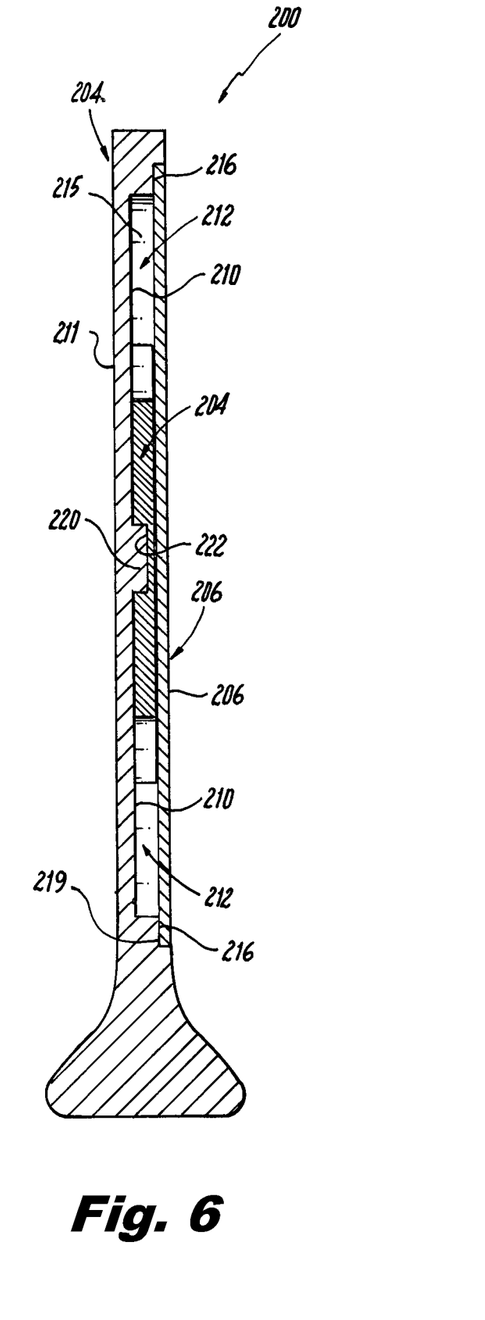
FIG. 6 is a cross-sectional side elevation view of the fan blade of FIG. 4, showing the composite rib adhered to the cover, blade rib and blade body.

As shown in FIG. 6, composite rib 204 is adhered to bottom surface 210 of pocket 212 and to cover 206, similar to composite rib 104, described above. Composite rib 204 is adhered to blade rib 220 and includes a groove 222 corresponding to a shape of the blade rib. Blade rib 220 is adhered within groove 222 to increase a surface area of composite rib 204 in contact with blade rib 220. Composite rib 204 extends from a leading edge side 213 to a trailing edge side 215 of pocket 212, and is adhered to leading edge side 213 and trailing edge side 215 of pocket 212. Composite rib 204 is configured similar to composite rib 104, as described above, with respect to shear and tension forces. Composite rib 204 is further configured to increase the adhesive surface area between cover 206 and blade body 202, relative to the adhesive area with ribs 220 alone.

Figure 7:
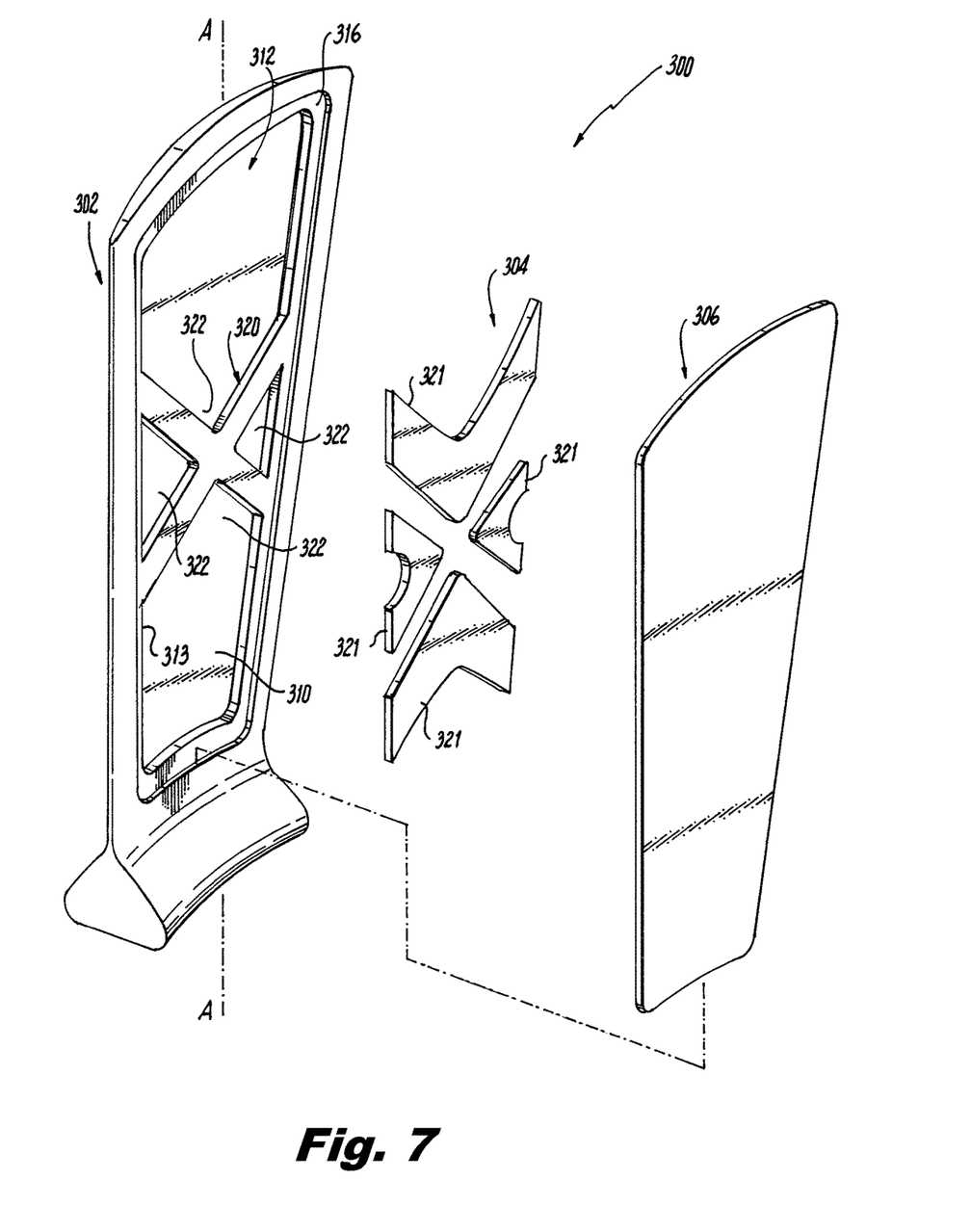
FIG. 7 is a perspective exploded view of another exemplary embodiment of a fan blade constructed in accordance with the present disclosure, showing a blade rib and composite rib portions.

Now with reference to FIG. 7, fan blade 300 has a blade body 302, a blade rib 320, a cover 306 and a plurality of composite rib portions 321 forming composite rib 304. Blade body 302 is substantially similar to blade body 202. Cover 306 is substantially similar to cover 206. And, blade rib 320 is substantially similar to blade rib 220. Further, cover 306 is adhered to a recessed lip 316 of blade body 302 in a similar manner as was described above with respect to cover 206 and blade body 202. Blade body 302 includes a plurality of sub-pockets 322 formed within a pocket 312. Pocket 312, is substantially similar to pocket 212, described above. Composite rib portions 321 are each disposed in a respective one of sub-pockets 322. Composite rib portions 321 are shaped to correspond to a shape of the blade rib 320 and are configured to increase a surface area of composite rib 304 in contact with blade rib 320. Composite rib portions 321 are adhered to the blade rib 320, a bottom surface 310 of pocket 312 and an interior surface of cover 306. Interior surface is not shown, but it is similar to interior surface 219 of cover 206, described above. Composite rib 304 extends from a leading edge side 313 to a trailing edge side 315 of pocket 312. At least one composite rib portion 321 of composite rib 304 is adhered to leading edge side 313 and at least one composite rib portion 321 of composite rib 304 is adhered to trailing edge side 315 of pocket 312. Composite rib 304 is configured similar to composite rib 104, as described above, with respect to shear and tension forces.

Those skilled in the art will readily appreciate composite ribs, e.g. composite ribs 104, 204 and 304, allow for a fan blade, e.g. fan blades 100, 200, and 300, with more strength and less weight than traditional fan blades. It is contemplated that composite ribs can be manufactured in a variety of ways as suitable for a given application, for example, by using machined chopped fiber. Further, those skilled in the art will also readily appreciate that composite ribs have sufficient tensile strength such that the composite ribs will not crack into pieces due to an impact, for example, a bird strike. In addition, those skilled in the art will readily appreciate that composite ribs can be configured to increase a surface area of the composite rib in contact with the cover, e.g. cover 106, 206 and 306, and with the blade, e.g. blade 102, 202 and 302, making the fan blade more durable than traditional fan blades.

The methods and systems of the present disclosure, as described above and shown in the drawings, provide for fan blade assemblies with superior properties including improved impact resistance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A fan blade, comprising:
a blade body extending from a blade root to an opposed blade tip along a longitudinal axis, wherein the blade body defines a leading edge and a trailing edge,
a first airfoil surface extending from the leading edge to the trailing edge, and
a pocket defined between a plurality of edges including, the leading edge, the trailing edge, a first edge at the blade root and a second edge at the blade tip,
the pocket having a bottom surface that extends between the plurality of edges and faces an inside of the pocket, wherein the bottom surface opposes the first airfoil surface across the blade body;
a cover mounted to the blade body to form a second airfoil surface opposed to the first airfoil surface, wherein the cover encloses the pocket, and
a composite rib disposed in the pocket, wherein the composite rib includes a front surface and a back surface, the front surface being adhered to the bottom surface of the pocket and the back surface being adhered to the cover, and
wherein the composite rib is cross shaped to define a first pair of edges facing the leading edge of the pocket and a second pair of edges facing the trailing edge of the pocket.

2. The fan blade as recited in claim 1, wherein the composite rib includes a weight reducing cavity that projects from the back surface and through the front surface of the composite rib, the cavity defining a groove that includes a first pair of edge openings facing the leading edge of the pocket and a second pair of edge openings facing the trailing edge of the pocket.

3. The fan blade as recited in claim 2, wherein the groove is cross shaped.

4. The fan blade as recited in claim 1, wherein the composite rib is configured to resist shear and tension forces acting on the cover in order to secure the cover to the blade body.

5. The fan blade as recited in claim 1, wherein the blade body includes a recessed lip defined around its perimeter.

6. The fan blade as recited in claim 5, wherein an interior surface of the cover is adhered to the blade body on the recessed lip, wherein the recessed lip is configured to allow the cover to be mounted flush with the blade body.

7. The fan blade as recited in claim 1, wherein the pocket of the blade body is at least partially filled with lightweight filler material.

8. The fan blade as recited in claim 1, wherein the composite rib extends from a leading edge side of the pocket to a trailing edge side of the pocket.

9. The fan blade as recited in claim 8, wherein the composite rib is adhered to the leading edge side of the pocket and the trailing edge side of the pocket.

10. The fan blade as recited in claim 1, wherein the composite rib includes lightweight filler material.

11. A fan blade, comprising:
a blade body extending from a blade root to an opposed blade tip along a longitudinal axis, wherein the blade body defines a leading edge and a trailing edge,
a first airfoil surface extending from the leading edge to the trailing edge, and
a pocket defined between a plurality of edges including the leading edge, the trailing edge, a first edge at the blade root and a second edge at the blade tip,
the pocket having a bottom surface that extends between the plurality of the edges and faces an inside of the pocket, wherein the bottom surface opposes the first airfoil surface across the blade body,
a cover mounted to the composite rib and the blade body to form a second airfoil surface opposed to the first airfoil surface, wherein the cover encloses the pocket, and
a composite rib disposed in the pocket, wherein the composite rib includes a front surface and a back surface, the front surface being adhered to the bottom surface of the pocket and the back surface being adhered to the cover, and
wherein the composite rib is cross shaped to define a first pair of edges facing the leading edge of the pocket and a second pair of edges facing the trailing edge of the pocket.

12. The fan blade as recited in claim 11, wherein the composite rib includes a weight reducing cavity that projects from the back surface and through the front surface of the composite rib, the cavity defining a cross-shaped groove that includes a first pair of edge openings facing the leading edge of the pocket and a second pair of edge openings facing the trailing edge of the pocket.

13. The fan blade as recited in claim 12, wherein the groove of the composite rib corresponding to a shape of the blade rib, wherein the blade rib is adhered to the composite rib within the groove to increase a surface area of the composite rib in contact with the blade rib.

14. The fan blade as recited in claim 11, wherein the blade rib is integral with the blade body.

15. The fan blade as recited in claim 12, wherein the groove is cross shaped.

* * * * *